Feb. 4, 1930.　　　A. STUBER ET AL　　　1,745,874
SELF THREADING MOTION PICTURE APPARATUS
Filed Dec. 4, 1925
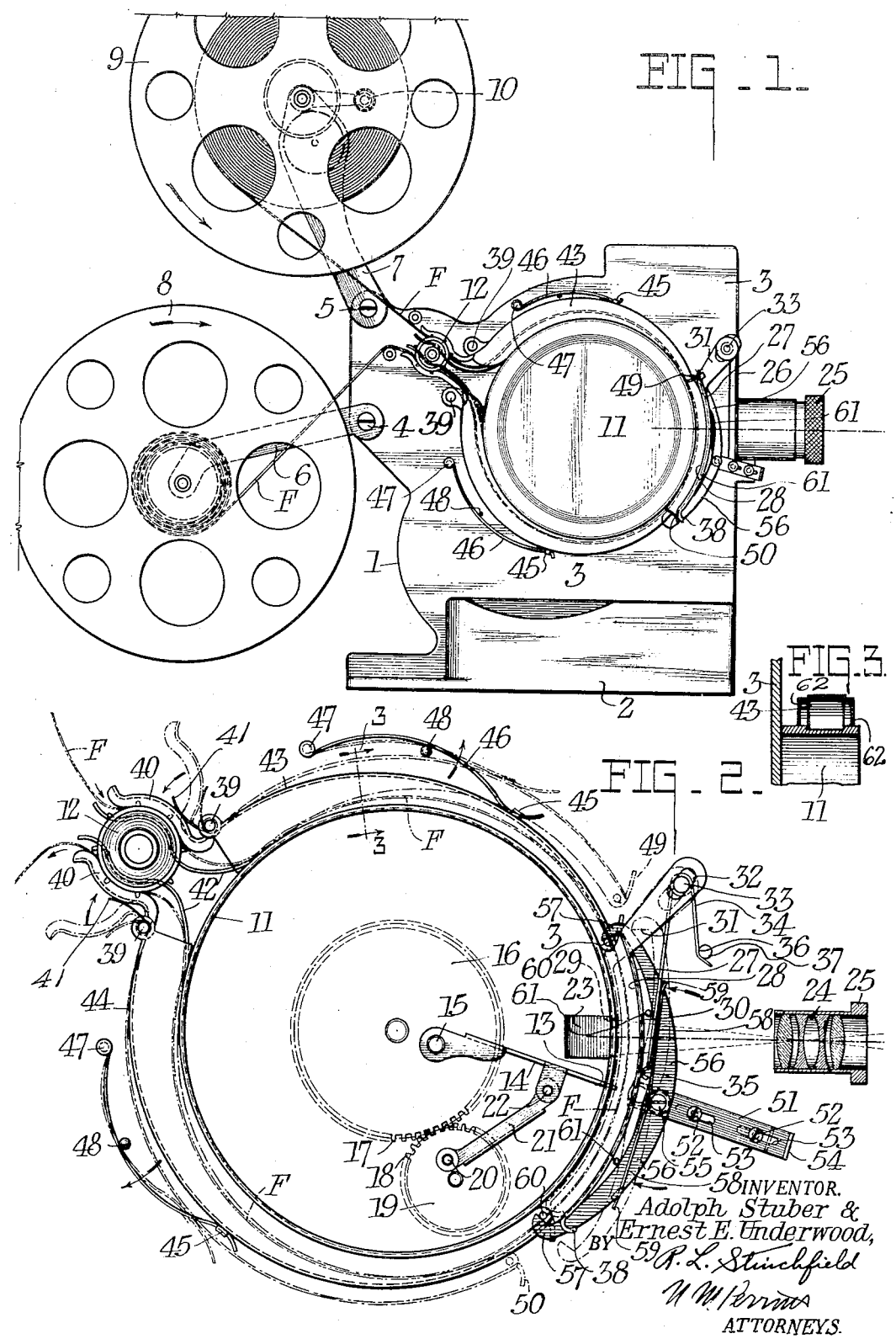
INVENTOR.
Adolph Stuber &
Ernest E. Underwood,
BY R. L. Stinchfield
ATTORNEYS.

Patented Feb. 4, 1930

1,745,874

UNITED STATES PATENT OFFICE

ADOLPH STUBER AND ERNEST E. UNDERWOOD, OF ROCHESTER, NEW YORK, ASSIGNORS TO EASTMAN KODAK COMPANY, OF ROCHESTER, NEW YORK, A CORPORATION OF NEW YORK

SELF-THREADING MOTION-PICTURE APPARATUS

Application filed December 4, 1925. Serial No. 73,119.

This invention relates to motion picture apparatus and more particularly to mechanism for automatically threading a film therethrough.

This object is attained by providing pairs of guiding elements which form passages leading from one to the other to constitute a closed tunnel-like channel leading from the entrance point of the film to its exit point. These passages are effective for threading the film without obstacle but after threading, the guiding elements are removed from such position to permit the operation of the device in the usual way Further objects are the automatic provision of loop forming spaces, the automatic feeding of the film to and through the machine when once introduced and the easy and partially automatic manipulation and control of the parts.

Other objects will appear in the following description wherein reference is made to the accompanying drawing in the several figures of which the same reference characters indicate the same parts throughout.

Fig. 1 is a side view of a motion picture projector embodying our invention.

Fig. 2 is a side view of the members that guide the film through the machine.

Fig. 3 is a section on line 3—3 of Fig. 2.

The invention, as illustrated, is embodied in a projector having a rigid frame or body 1 of suitable conformation the principal components of which are a heavy base 2 and a longitudinal wall 3. On the rear are pivoted at 4 and 5 arms 6 and 7 supporting reels 8 and 9 respectively, there being for the latter a rewind mechanism 10.

The partition carries a cylindrical casing 11 on one side about which the film F is adapted to pass in a loop, being propelled continuously from reel 9 and to reel 8 by sprocket 12, and being advanced intermittently by claw 13 on the arm 14 which is pivoted at the other end 15 to a driven disc 16 having gear teeth 17 intermeshing with gear teeth 18 of disc 19 to which is pivoted at 20 a link 21, which is also pivoted at 22 to arm 14. Light from a lamp house (not shown) mounted in the rear of the wall 3 is reflected by mirror 23 upon the film at a suitable window and the image is projected by objective 24 upon a screen. The objective 24 is in the usual mount 25 carried on a plate 26 by the wall 3.

We do not claim the above general structures as our invention, but this type of projector is described in part to show an application of our invention. It is to be understood that the full details of the projector have not been shown or described, but only such features as appear desirable for an understanding of our invention.

A presser member 27 for the film has an arcuate surface 28 adapted to fit against the side of the casing 11 and form with it a guide for the film as it passes the projection windows at 29 and 30 in these members. At its upper end, this presser member has an arm 31 with a slot 32 having slidable engagement with a pin 33 carried by wall 3. A spring 34 is coiled around the pin and one end 35 contacts the presser member, normally pressing it into operative position, while the other end 36 engages a fixed stud 37 on wall 3. The lower end of the presser member is curved backward at 38.

If it should be desired to gain access for the removal or insertion of the film edgewise, this can easily be done because neither the presser member or casing has flanges overlapping the other. A film can accordingly be slid edgewise between them from the side and can also be removed.

Near the sprocket 12 are two trunnions 39 on which are pivoted two members 40 which are pressed by springs 41 toward the sprocket. Fixed guide members 42 extend between the flanges of the sprocket to the casing 11. Pivoted on the same trunnions are two symmetrically arranged guide members 43 and 44 having small cross bars 45 beneath which engage the ends of leaf springs 46 the other ends of which are attached to pins 47 on wall 3 and which are bowed around the pins 48, also on wall 3, so that they exert an outward tension on members 43 and 44. The ends of members 43 and 44 are bevelled with rearwardly extending ears 49 and 50.

A latch mechanism for holding the parts will now be described. A member 51 has sliding engagement by means of the pins 52 and slots 53 with the wall 3 and has a short handle 54 on one end and a screw 55 at the other end on which are pivoted the two arms 56 with hooks 57 at their ends. The arms are pressed toward the casing by spring 58 which is centrally coiled around screw 55 and has arms 59 engaging the arms 56. The hooks 57 are adapted to engage over pins 60 near the ends of arms 43 and 44. Arms 56 tend to rock around pins 61 carried by wall 3.

The members 43 and 44 are U shaped in cross-section as shown in Fig. 3 and both these members and the outer wall of the casing 11 have edge ledges 62 engaging the borders only of the film.

The user, when about to thread the projector with film, presses members 43 and 44 toward the casing against the tension of springs 46. The bevelled ear 49 engages the wall of the inclined arm 31, and the ear 50 engages the curved end 38 at the lower end of presser member 27, camming this member away from the casing against spring 34, it being guided by slot 32 sliding on pin 33. Pins 60 at the same time engage the sloping edges of hooks 57 which are retracted and then snap over pins 60, under the influence of spring 58, thus constituting a latch connection.

The user then introduces the end of a film between upper guide members 40 and 42 until the perforations are engaged by the teeth of sprocket 12. With the machine in operation, the film will be guided by members 42 into the open channel provided between 43 and casing 11. It will naturally follow the member 43 around and will pass readily beneath presser member 27, which is being held away from the casing 11, and then will follow member 44 around until it engages the lower guide 42 which directs it beneath lower member 40 into engagement with the sprocket 12.

The film naturally follows the exterior wall of the channel thus provided around the casing and forms a loop sufficiently larger than the casing to provide the necessary slack between the continuously advancing sprocket and the intermittent claw. Although the claw is in motion during the threading operation, the film tends to follow the presser member forming the outside of the channel at this point and so avoids the claws.

As soon as the end of the film emerges from sprocket 12, the user presses in on handle 54, releasing the latch mechanism by moving pivot 55 and the inner ends of arms 56 which rock around the pins 61 and lift the hooks 57, releasing pins 60, whereupon members 43 and 44 are swung outwardly by springs 46 and presser member 27, under the influence of spring 34 presses film F against the casing 11, whereupon its perforations are engaged by the claw and intermittently advanced. Upon being released, the member 51 is pressed outwardly and hooks 57 inwardly by spring 58.

The machine is now in operation and as soon as a sufficient length of film is protruded the user attaches it to the core of take-up reel 8 in the usual manner. The only operations performed by the user in connection with threading the film into the machine are the following: placing a reel 9 in position, starting the machine, pressing members 43 and 44 inwardly, introducing the end of the film upon the sprocket 12, pushing handle 54, and attaching the end of the film to the take-up reel.

In Fig. 2, the parts are shown in full lines in their film guiding and looping positions and in dotted lines in their alternative positions. When in dotted line position, they are so far removed from the casing 11, as to leave a space unobstructed at the side. It is to be understood that in ordinary use the members 40 are not swung away from the sprocket, this being done only for cleaning the sprocket teeth or the like. When swung away to the dotted line position of Fig. 2 they leave spaces between themselves and the sprocket 12 that are unobstructed at the side. The film is shown in dotted lines in the position it assumes when the machine is operating.

It is to be observed that if during the projection of a film it is decided to discontinue the projection and remove the film this can readily be done because the guides 12 can be swung back permitting the edgewise removal of the film from the sprocket space; the film can be removed in an edgewise direction from beneath the guides 43 and 44 and can be slid out from beneath the presser 27. Similarly if desired the apparatus can be threaded by the edgewise insertion of the film.

It will be seen that there is provided a tunnel like passage leading entirely through the apparatus and composed of several pairs of complementary elements, each enclosing a part of said tunnel and leading directly from one to the other and constituting a free and clear channel or guide way for the film.

It is to be understood that the above disclosure is by way of example and that we contemplate as included in our invention all such modifications and equivalents as properly fall within the scope of the appended claims.

Having thus described our invention, what we claim as new and desire to secure by Letters Patent is:

1. In a motion picture apparatus, means for feeding a film, an exposure gate comprising a member movable between two positions in one of which it leaves a film guiding channel past the gate, a member movable between two positions in one of which it is adapted to guide a film between the film feeding means and the gate, said movable members having complementary camming surfaces whereby one, upon movement to film guiding position, will engage and move the other also to film guiding position.

2. In a motion picture apparatus, means for feeding a film, an exposure gate comprising a member movable between two positions in one of which it leaves a film guiding channel past the gate, a member movable between two positions in one of which it is adapted to guide a film between the film feeding means and the gate, said movable members having complementary camming surfaces, the cam surface of the second member being adapted to engage and move the first to film guiding position, when the second member is moved to film guiding position.

3. In a motion picture apparatus, means for feeding a film, an exposure gate comprising a member movable between two positions in one of which it leaves a film guiding channel past the gate, a member movable between two positions in one of which it is adapted to guide a film between the film feeding means and the gate, said movable members having complementary camming surfaces, the cam surface of the second member being adapted to engage and move the first to film guiding position, when the second member is moved to film guiding position, and a latch member adapted to engage the second member and thereby hold both members in film guiding position.

4. In a motion picture apparatus, a film feeding sprocket, an exposure gate comprising a movable film guide, a guide having a concave surface adapted to engage and direct in a loop the lead end of a film between the sprocket and the gate, and movable to and from guiding position and adapted, in its movement to guiding position, to move said first named guide.

5. In a motion picture apparatus, a film feeding means, an exposure gate comprising a movable member, a member adapted to guide a film between the film feeding means and the gate, and movable to and from guiding position, the path of movement of a part of said second named member intersecting a part of the first named member, whereby it is adapted in its movement to guiding position to engage and move said movable member of the gate.

6. In a motion picture apparatus, means for feeding a film to and from an exposure gate, an exposure gate comprising a fixed guide and a presser guide, guides with concave surfaces for directing the lead end of a film in both directions between said feeding means and said gate and movable to and from guiding position, and adapted, in their movement to guiding position, to move said presser guide away from the fixed guide.

7. In a motion picture apparatus, a single sprocket, film guides leading past opposite sides of said sprocket, an exposure gate comprising a fixed guide and a presser guide, and members having concave guiding surfaces for directing the lead end of a film from said sprocket to said gate and from said gate to said sprocket, said members being movable to and from said guiding position, said members being adapted in their movement to guiding position to move said presser guideway from the fixed guide.

8. In a motion picture apparatus, a film gate comprising two relatively movable members having a closed relation and an open relation, and in the open relation constituting a film guiding channel, a sprocket for feeding a film toward and from said gate, guide means adapted to hold film in engagement with the sprocket and to direct it from the sprocket toward the gate and from the gate toward the sprocket, and a second means for guiding film from said sprocket and its associated guide means to the gate, and from the gate to the sprocket and its associated guide means, said second means comprising members movable to and from film guiding position, and adapted in their movement to guiding position to cause the separation of the gate members.

9. In a motion picture apparatus, a gate, a first film guide, a second film guide for directing film from said first film guide to the gate, a third film guide, a fourth film guide for directing film from said gate to said third film guide, means at the first and third film guides for feeding film, the gate comprising members adapted to be separated to constitute a film guide, and the second and fourth film guides each comprising a member movable to and from film guiding position, and adapted in their movement to film guiding position to cause the separation of the gate members; all of said guides leading directly one to another whereby a film introduced into the first guide will be engaged by the film feeding means thereat, and fed automatically and successively through all of the guides.

10. In a motion picture apparatus, a curved casing, a curved presser member movable between two positions in one of which it engages a portion of the casing and constitutes therewith an exposure gate and in the other of which it is separated therefrom to constitute a film guide, and movable guide members having a position near the casing on each side of the gate and constituting with the casing film channels leading to and from said gate.

11. In a motion picture apparatus, a curved casing, a curved presser member movable between two positions in one of which it engages a portion of the casing and constitutes therewith an exposure gate and in the other of which it is separated therefrom to constitute a film guide, and movable guide members having a position near the casing on each side of the gate and constituting with the casing film channels leading to and from said gate, the ends of the guide members having a path of movement toward the casing intersecting the ends of the presser member, whereby they are adapted to engage the ends of the presser member and move it away from the casing.

12. In a motion picture apparatus, a curved casing, a curved presser member movable between two positions in one of which it engages a portion of the casing and constitutes therewith an exposure gate and in the other of which it is separated therefrom to constitute a film guide channel, movable guide members having a position near the casing on each side of the gate and constituting with the casing film guide channels leading from the gate, and sprocket means on the side of the casing opposite the presser member adapted to feed film in a loop around the casing and through the film guide channels from and to the sprocket means.

13. In motion picture apparatus, a film gate comprising a fixed member and a movable presser member, loop forming guides on each side of said gate, said guides being movable and having positions where they guide a film to and from said gate, the guides in their movement to the guiding positions being adapted to engage and move said presser member away from the fixed member, and latch means adapted to engage the guides and hold them in guiding position.

14. In motion picture apparatus, a film gate comprising a fixed member and a movable presser member, loop forming guides on each side of said gate, said guides being movable and having positions where they guide a film to and from said gate, the guides in their movement to the guiding positions being adapted to engage and move said presser member away from the fixed member, and spring pressed latch means adapted to engage the guides automatically as they are moved to guiding position and hold them in such position.

15. In motion picture apparatus, a film gate comprising a fixed member and a movable presser member, loop forming guides on each side of said gate, said guides being movable and having positions where they guide a film to and from said gate, the guides in their movement to the guiding positions being adapted to engage and move said presser member away from the fixed member, and latch means adapted to engage the guides and hold them in guiding position, said guides being spring pressed away from guiding position, whereby, upon release of the latch means, they will automatically be retracted from guiding position.

16. In motion picture apparatus, a film gate comprising a fixed member and a movable presser member, loop forming guides on each side of said gate, said guides being movable and having positions where they guide a film to and from said gate, the guides in their movement to the guiding positions being adapted to engage and move said presser member away from the fixed member, said presser member being spring pressed toward the fixed member, whereby, upon movement of the guide members from guiding position, it will automatically move toward the fixed member.

17. In motion picture apparatus, a series of sets of guide members constituting channels leading from one to the other to constitute a continuous, tunnel-like passage through the apparatus, each set comprising a member forming the bottom of the tunnel and another member forming the top thereof, at least one member of each set being movable, and means including a common control for simultaneously moving the movable member of each set to destroy the continuity of the tunnel.

18. In motion picture apparatus, a series of sets of guide members constituting channels leading from one to the other to constitute a continuous, tunnel-like, passage through the apparatus, each set comprising a member forming the bottom of the tunnel and another member forming the top thereof, at least one member of each set being movable, and means including a common control for simultaneously moving the movable member of each set to destroy the tunnel-like form of the several channels and the continuity of the passage.

19. In motion picture apparatus, a series of sets of opposed guide members, the members of each set being relatively movable toward and from one another, and when in certain predetermined relative positions constituting channels leading directly from one to the other to constitute a continuous, tunnel-like passage, through the apparatus through which the advancing end of a propelled film will be automatically guided.

20. In motion picture apparatus, a series of sets of opposed guide members, the members of each set being relatively movable toward and from one another, and when in certain predetermined relative positions constituting channels leading directly from one to the other to constitute a continuous, tunnel-like passage, through the apparatus for the automatic guidance of the advancing end of a propelled film and when removed from said position to alternative positions leaving an unobstructed space open at the side whereby a band of film may be removed or inserted laterally between the members of the sets.

21. In a motion picture apparatus, means for guiding the lead end of a strip of film through such apparatus and comprising a movable presser member, a separate movable member in the path of the film and positioned to deflect the propelled end of a film and guide it in a loop; said members being each movable between two positions in one of which they are operative to guide the lead end of a propelled film and in the other of which they are inoperative to guide it, said means including elements interconnecting said members and capable of transmitting force directly from one movable member to the other.

22. In a motion picture apparatus, means for guiding the lead end of a strip of film through such apparatus and comprising a movable presser member, a separate movable member in the path of the film and positioned to deflect the propelled end of a film and guide it in a loop; said members being each movable between two positions in one of which they are operative to guide the lead end of a propelled film and in the other of which they are inoperative to guide it, said means including elements interconnecting said members and capable of transmitting force directly from one movable member to the other, whereby movement of one to guiding position will cause movement of the other also to guiding position.

Signed at Rochester, New York this 30th day of November 1925.

ERNEST E. UNDERWOOD.
ADOLPH STUBER.